May 14, 1940.  T. P. FLYNN ET AL  2,200,447
CABLE LIFT BULLDOZER
Filed Sept. 8, 1937   6 Sheets-Sheet 1

INVENTORS.
THEODORE P. FLYNN
RAYMOND E. NEILS.
BY Albert J. Kearns
ATTORNEY

INVENTORS
THEODORE P. FLYNN.
RAYMOND E. NEILS.
BY Albert J. Kramer
ATTORNEY

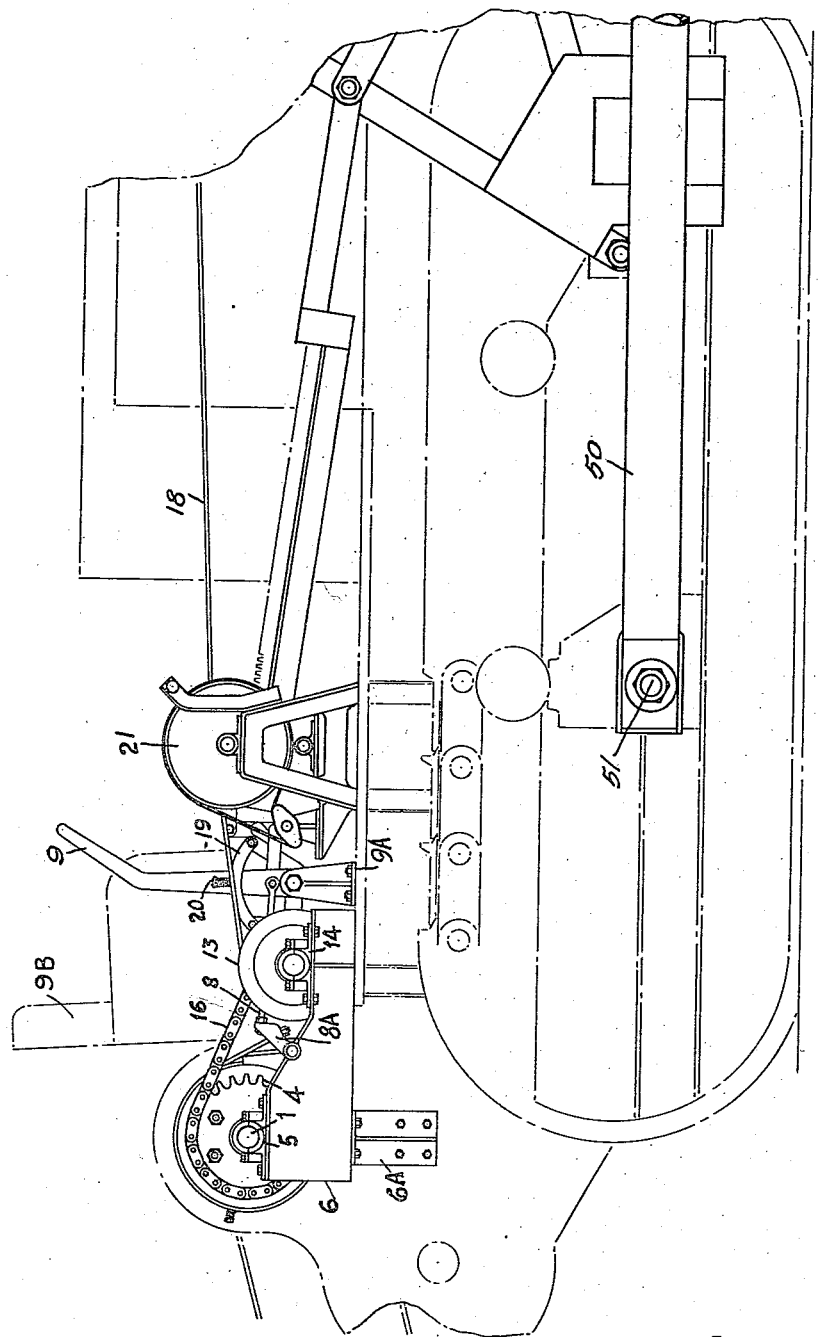

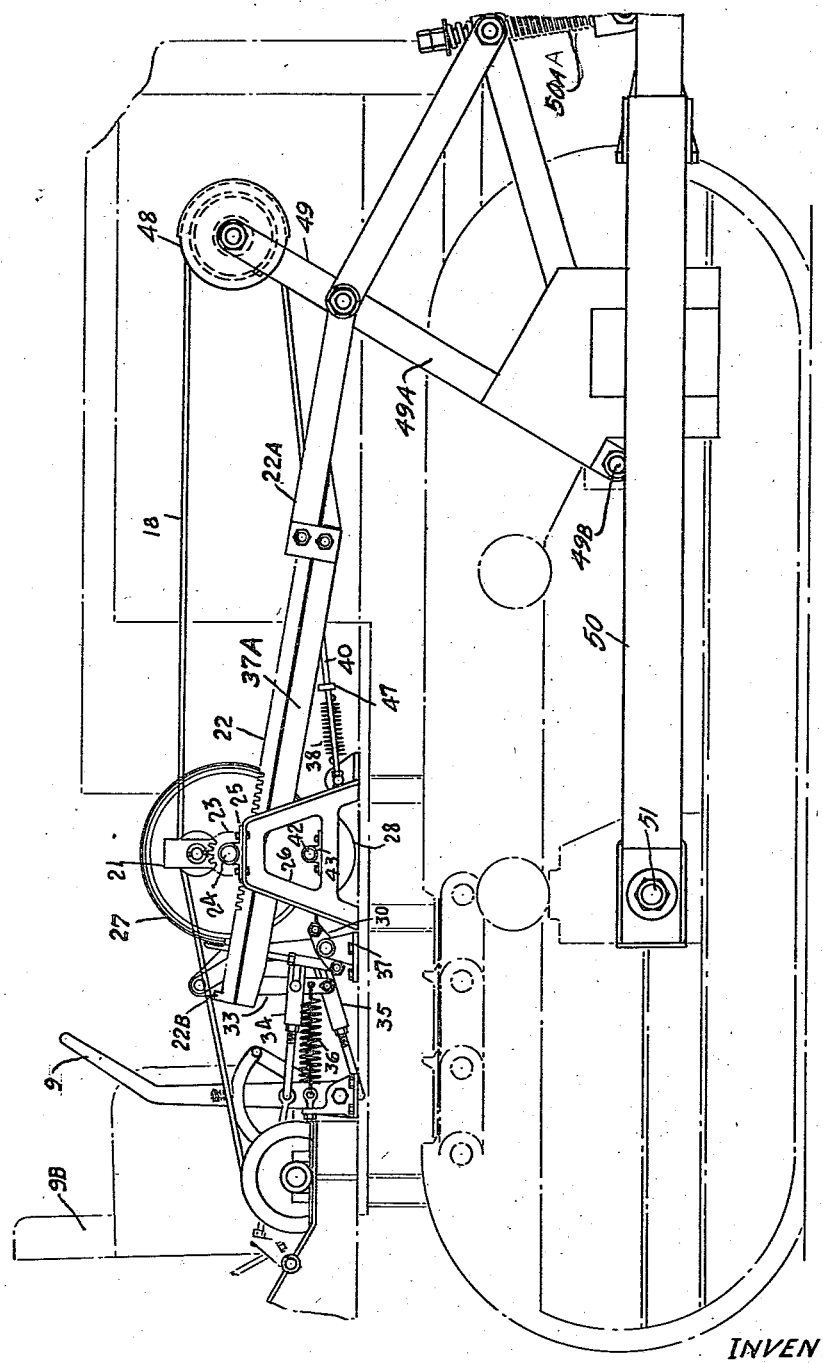

May 14, 1940.　　　　T. P. FLYNN ET AL　　　　2,200,447
CABLE LIFT BULLDOZER
Filed Sept. 8, 1937　　　　6 Sheets-Sheet 5
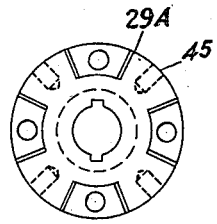
FIG 8.
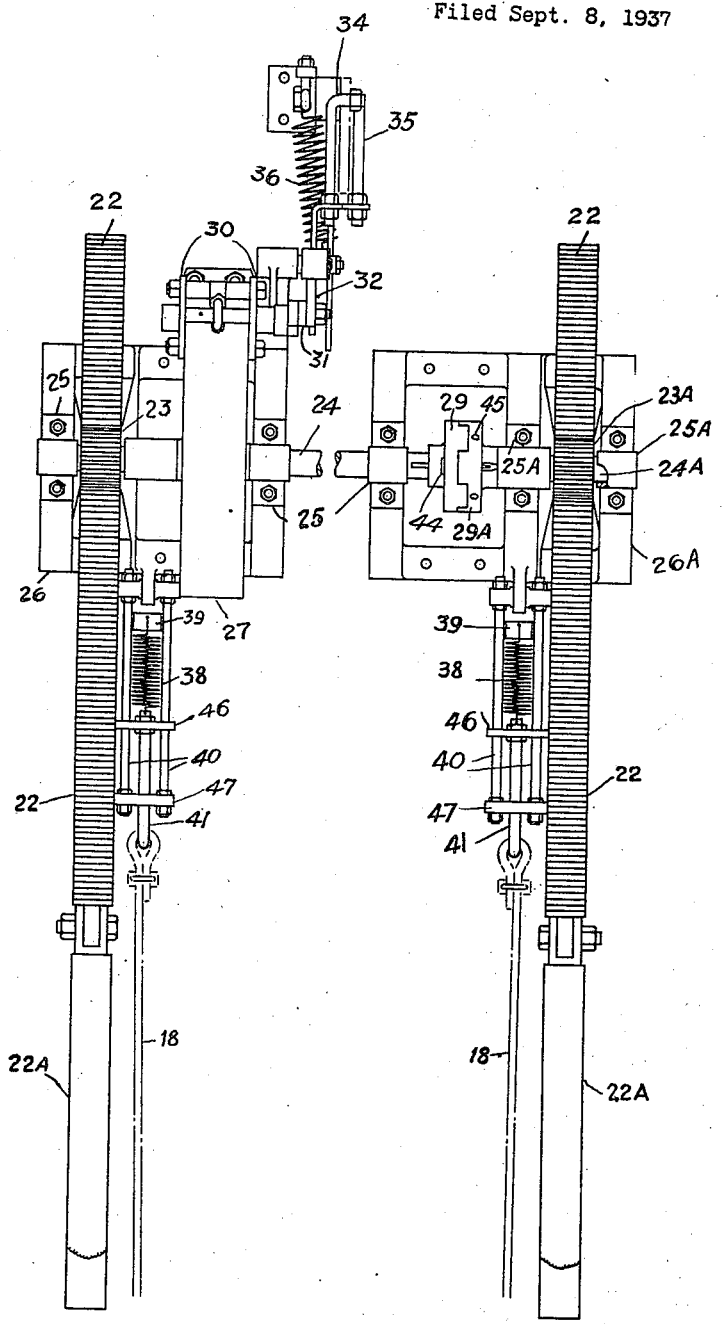
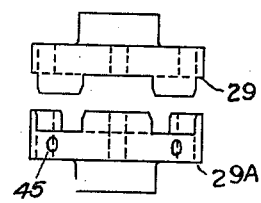
FIG 9.
FIG 7.
INVENTORS
THEODORE P. FLYNN
RAYMOND E. NEILS
BY
ATTORNEY May 14, 1940.   T. P. FLYNN ET AL   2,200,447
CABLE LIFT BULLDOZER
Filed Sept. 8, 1937   6 Sheets—Sheet 6

INVENTORS
THEODORE P. FLYNN.
RAYMOND E. NEILS.
BY
Albert J. Kramer
ATTORNEY

Patented May 14, 1940

2,200,447

UNITED STATES PATENT OFFICE 2,200,447

CABLE LIFT BULLDOZER

Theodore P. Flynn and Raymond E. Neils, Portland, Oreg., dedicated to the free use of the Public in the territory of the United States of America Application September 8, 1937, Serial No. 162,877

6 Claims. (Cl. 37—144)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without payment to us of any royalty thereon.

We hereby dedicate the invention herein described to the free use of the Public in the territory of the United States of America, to take effect upon the granting of a patent to us.

This invention relates to a grading device attached to a conventional tractor and has for an important object an arrangement of geared power mechanism to elevate, lower, hold, and float a bulldozer blade and to otherwise improve and simplify arrangements now in use for this purpose.

Another object of this invention is to provide an arrangement of bulldozer lifting and lowering mechanism that can be readily adapted and attached to any conventional tractor that is already equipped with a single or double drum hoist unit.

Still another object of this invention is to apply and use a special planetary clutching and speed reducing device to the ends of the shafting of any hoists or drums that are already on the tractor, and this clutching and speed reducing device attached to said drums in such a manner as not to interfere with the full use of the hoisting drums for regular hoisting work.

A further object is to provide, through certain gear reductions, leverages, and other power transmitting connections, a combination and relationship of power transmitting mechanism that will require and take away the least possible amount of power from the tractor motor. The combination of these mechanisms as they are arranged in this device has a distinct advantage in this respect, in that the lifting of the bulldozer blade, which requires the greatest amount of power of all the movements of a bulldozer blade, is accomplished with a combination lifting mechanism when the tractor motor is turning over at its lowest possible idling speed. Conventional hydraulically operated bulldozers now in general use require that the tractor motor be operated at a speed considerably greater than its lowest idling speed before enough hydraulic pressure can be developed to raise the bulldozer blade in any reasonable length of time.

A still further object is the provision of a simple geared, clutching, speed-reducing, and auxiliary power transmitting unit, which is attached to and receives its power from the ends of the drum or the hoist shafting already on the tractor, eliminating the necessity for any additional or special power takeoff units to lift the bulldozer, in that the hoisting drums which may be on the tractor receive their power from the only convenient power takeoff point on conventional tractors, and serve as a power takeoff for the clutching, speed-reducing device. It would be very impracticable and nearly impossible to successfully obtain another power takeoff point for bulldozer lifting use other than the conventional one that is occupied by the hoisting or drum units already on the tractor. Therefore, the auxiliary clutching speed reducing, power transmitting device described, when attached to the extended shafting of the drum ends, receives its power from these drum ends, and this planetary clutching device is then in a position and so arranged as to deliver and transmit power separately and independently, without interfering with the drums or hoisting unit, to bulldozer lifting or other apparatus requiring lifting power by winding motion.

A still further object of this invention is to provide by means of cable wheels, winding or spooling, a wire rope, or other flexible connection, a simplified power lifting arrangement for raising a bulldozer blade or other apparatus.

The lifting cable and cable supporting arrangement in this invention divide the total bulldozer blade lifting stresses equally and squarely over and on the two tractor tracks, and this is especially favorable to the tractor design and to the operation of the tractor.

Another feature of this cable lifting arrangement is that the total amount of cable required for both sides is one-third or less than the total amount required for any other cable-lift bulldozer arrangement now in use, and the method of spooling and threading the cable with this invention over only one large sheave provides further economy, in that cable wear and replacement are reduced to a minimum, and the life of the lifting cable is increased twenty times or more over the life of a cable used on any other arrangement where two or more sheaves are employed.

A still further object is to provide a rigid holding arrangement, working automatically and in conjunction with the cable lifting apparatus, so that the bulldozer blade may be held firmly and rigidly in any grading position. This rigid automatic holding device and arrangement prevents the bulldozer blade from floating, which floating causes uneven grading or a wavy profile of the road surface. This holding arrangement is automatically in position at all times to prevent such floating when the bulldozer blade is working in hard materials, putting an even finished surface on a road bed, or whenever it is not desirable to operate the bulldozer blade in a free and floating position. The holding device is also arranged so as to give instantly and automatically a full and free float for the bulldozer blade when this full and free float is desired, such as for back-dragging, spreading, etc.

A still further object is to provide a one-lever control for the operator, which lever through an arrangement of automatically operated linkage, engages lifting power, disengages the holding arrangements, releases the lifting and holding mechanism for floating, and puts the holding mechanism into operation. All of these positions are obtained by only two movements, one forward and one rearward, of a single operating lever.

A still further object is to provide a complete arrangement of bulldozer lifting apparatus so that its total weight is distributed over the total length of the tractor tracks, so there will be no unbalancing of the tractor, and to place bulldozer lifting stresses at such points on the tractor that will not disturb its balance and at points that are designed and best able to take care of these stresses so that damage to the tractor will be reduced to a minimum with the added superimposed weights and lifting stresses.

Another and further object is to provide a simple and positive bulldozer lifting and blade holding arrangement made up of gear driven and cable connected apparatus, obviating the necessity of using the more expensive and complex hydraulically operated bulldozer lifting apparatus now in general use.

Still another and further object is to provide a complete inexpensive gear and cable driven bulldozer lifting and holding apparatus that can be readily attached to and installed on any tractor equipped with drum or hoisting apparatus but not already equipped with bulldozer hoisting apparatus, thus providing, with the combination of hoisting drum and bulldozer lifting apparatus, as described in this invention, a dual or more purposeful tractor unit which can perform logging or other operations requiring heavy duty hoisting drums, or perform road grading, clearing, and other operations performed by bulldozer machines, all mounted in one combined tractor unit.

The following specification, together with the accompanying drawings, will fully disclose this invention, and further objects and advantages thereof will be apparent.

In the drawings:

Figure 5 is a side view of the power delivery unit, as applied to a tractor, showing the method of connection to a bulldozer blade.

Figure 6 is a side view of the bulldozer blade holding device connected to the power delivery unit, showing the method of connection to the bulldozer blade and application to the tractor.

Figure 7 is a plan view of the holding and blade tilting unit.

Figure 8 is an end view of one-half of the blade tilting coupling.

Figure 9 is a plan view of the blade tilting coupling, showing the two half portions separated.

Figure 1:
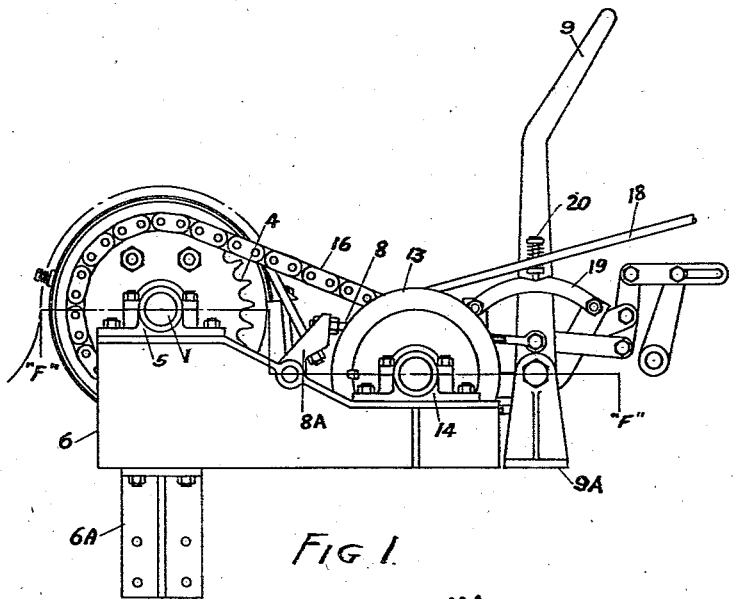
Figure 1 is a side view of the power delivery unit.
Figure 2:
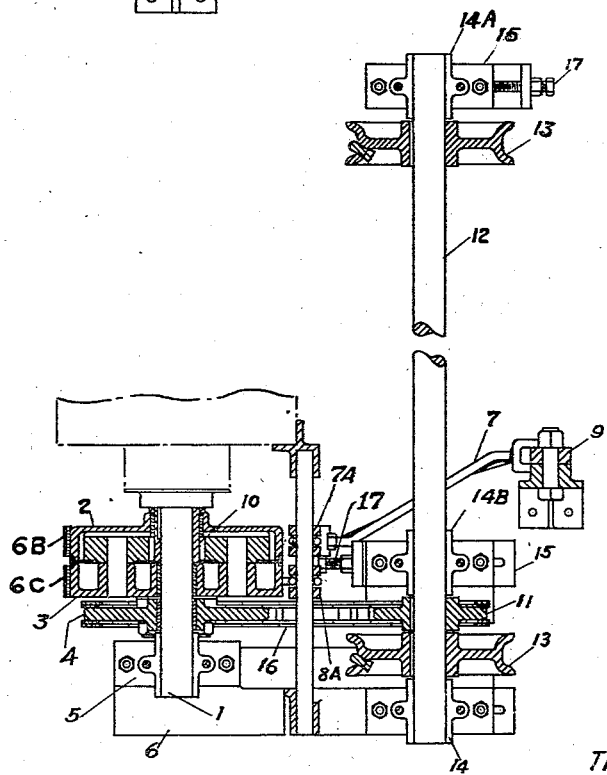
Figure 2 is a plan section taken along line F—F of Figure 1.
Figure 3:
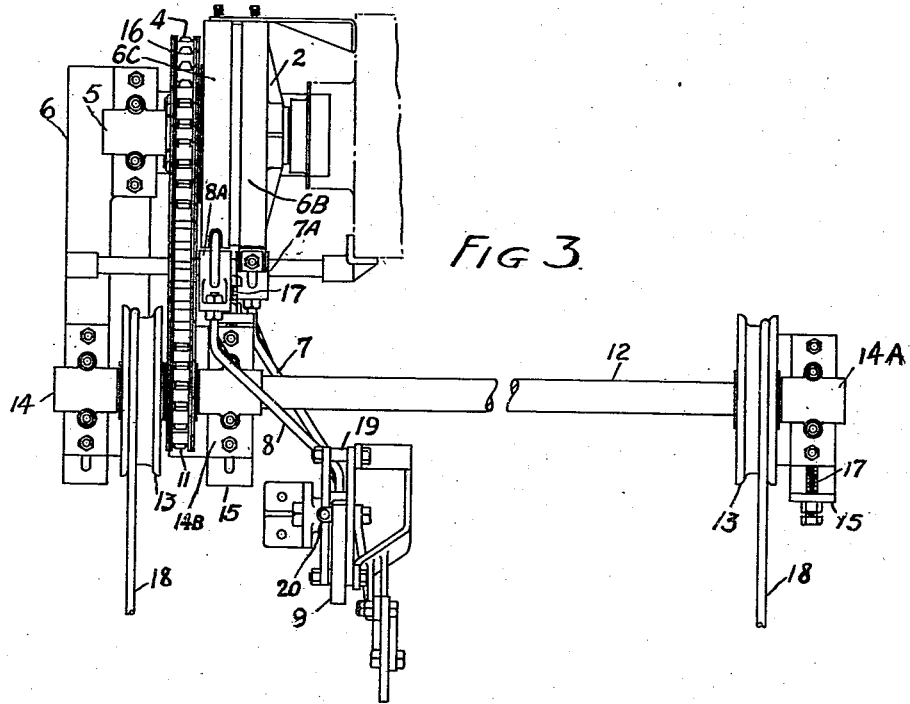
Figure 3 is a plan view of the said power delivery unit.
Figure 4:
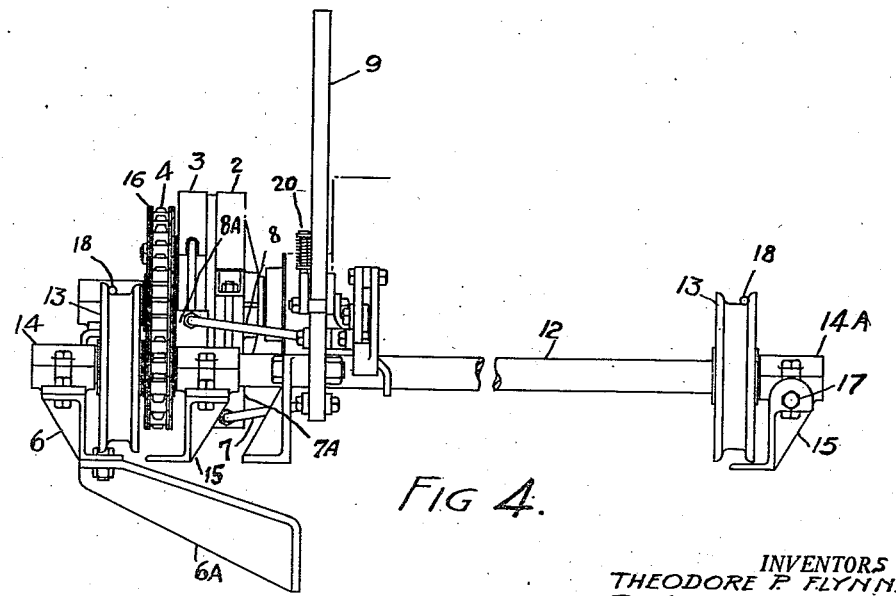
Figure 4 is an end view of the said power delivery unit.
Figure 10:
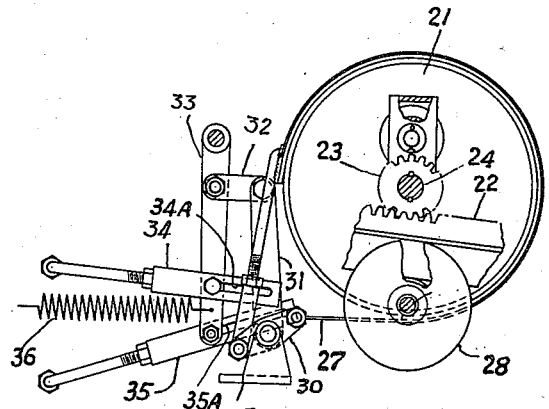
Figure 10 is a side view of the holding brake wheel and operating mechanism, with supporting members removed.
Figure 11:
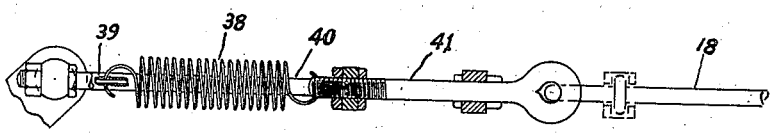
Figure 11 is a sectional side view of the cable slack takeup device.
Figure 12:
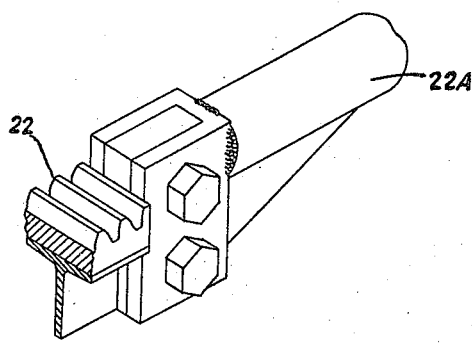
Figure 12 is a perspective view of the rack-holding and down-pressure arm.

Referring with more particularity to the drawings, in which like numbers refer to like parts, numeral 1 designates the drum driving shaft, actuated by extended shafts of the hoisting drum of the tractor, having its outer end mounted in the bearing 5 on the frame 6, supported by the bracket 6A. Mounted on said shaft is a driving sprocket 4 and a planetary gear arrangement 2 and 3. Both of the discs of the members 2 and 3 are made with flanged rims which serve as brake drums for clutching and braking. The interior of member 2 carries an internal gear of the planetary system, and the shafts of the planet pinions are secured in the web of the disc of member 3, which also has secured to it by means of bolts passing through bossed bearings the driving sprocket 4. The disc of the member 2 serves as a clutch, and the disc of member 3 serves as a brake.

The clutch band 6B and brake band 6C of the members 2 and 3, respectively, are connected by arms 7A and 8A and pull rods 7 and 8 to a single control lever 9 positioned near the operator's seat 9B and fulcrumed at the bracket 9A. The sun pinion 10 is keyed to the shaft 1, and the hub of said sun pinion 10 is a bearing for the disc of member 2. The disc of member 3, however, rotates freely on shaft 1.

The shaft is supported by three bearings, namely, 14, mounted on frame 6, and 14A and 14B, mounted on frame 15. The said shaft 12 is positioned substantially parallel to shaft 1 and as near to it as clearance will permit. The driven sprocket 11 and the cable wheels 13, 13 are keyed to shaft 12. These cable wheels are, with cables 18, 18, positioned for alignment with sheaves 48 on the lifting arms or stirrups 49. Said stirrups are fixed to rocker arms or bell cranks 49A, which bell cranks are pivoted to the frame of the tractor at 49B and connected to the push arms 50 by means of links 50A (Figure 6). The driving chain 16 engages the driving sprocket 4 with the driven sprocket 11. Set screws 17, 17 are provided in cooperative relation with the bearings 14, 14A and 14B, to permit adjustment of the said driving chain 16.

The shaft 24 is supported by bearings 25, 25, and has keyed to it the pinion gear 23. Similarly, the shaft 24A is supported by bearings 25A, 25A on the frame 26A, and has keyed to it the pinion gear 23A. Said pinion gears mesh with racks 22, 22. A holding drum brake wheel 21 is also keyed to said shaft 24. The brake band or shoe 27 is peripherally disposed on said wheel 21 and is actuated contractionally and expansionally with operating lever 9 by means of arms 30, lever 31, connecting link 32, and lever 33. Adjustable connections 34 and 35 are fastened to the operating lever 9. The brake band 27 is normally in the position of holding the brake drum 21 and is released only when raising or lowering the bulldozer blade. By these means, the bulldozer blade is firmly held in any position of its travel limits. The spring 36 is provided to insure immediate and automatic braking of the wheel 21, when the lever 9 returns to its neutral position.

The above-mentioned arms 30 are fulcrumed at the bracket 37, which braket is in turn bolted to the tractor. The said frame 26 is also bolted to the reinforced brackets of the tractor.

The links 22A, 22A connect the racks 22, 22 with the bell cranks 49A attached to the bulldozer blade holding pusharms 50, which pusharms are hinged at 51 to the frame of the bulldozer. The said racks 22, 22 each have a lower vertical member 37A serving as a guide for said racks by passing through the circumferential groove of wheel 28, all to the end that the teeth of the rods are held in proper engagement with their respective pinions 23 and 23A.

Mounted with a sliding key fit on shaft 24 is a half-section 29 of a special jaw clutch. The other half-section of the jaw clutch, designated by the number 29A, is mounted on shaft 24A, also with a sliding key fit. Thus the shafts 24 and 24A can be rotated independently of each other by disengaging the two jaw clutch halves. By these means, each end of the bulldozer blade can be elevated or lowered independently of each other.

The springs 38, 38 are tensionally mounted between the guides 40, 40, having one of their ends anchored to the members 39, 39, and the other ends secured to the guide pull rods, 41, 41. These pull rods serve as terminal fastenings for cables 18, 18. By these means any slack is automatically taken up in the cables 18, 18. When a pull is made with the cables 18, 18, springs 38, 38 stretch until guides 46, 46 come to rest against stops 47, 47. This combination also insures quicker action for the bulldozer blade and helps to obtain a more uniform spooling of said cables 18, 18.

The operation of this invention is as follows: With control lever 9 moved to engaging position, which is toward the rear of the tractor if shaft 1 is turning counterclockwise, and in the opposite direction if shaft 1 is turning clockwise, the brake band or shoe of the clutch disc of member 2 tightens, stopping the rotary motion of this disc. Immediately the internal gear of this disc becomes the track for the planet pinions, causing them to move around it, giving a rotary motion, in the same direction as shaft 1, to the disc of member 3 and sprocket 4. By means of the driving chain 16 motion is transmitted to sprocket 11, causing cable wheels 13, 13 to wind up the cables 18, 18, each of which cables passes over an idler sheave, such as the idler sheave 48. The other ends of the cables 18, 18 are anchored to the pull rods, 41, 41. The spooling of these cables shortens the distance between the wheels 13, 13, and the idler sheaves, thereby raising the bulldozer blade.

When the lever 9 is returned to its neutral position or mid-position on its guide quadrant 19, which is notched to receive a pressure pin 20 mounted on said lever 9, the brake band tension or brake shoe pressure on the flanged disc of member 2 is released, and the said disc is free to rotate, thus giving the least resistance to the force of the sun pinion 10, which forces must be dissipated through some medium, since shaft 1 is rotating constantly during either the bulldozing or drum hoisting operation. When the disc of member 2 is free to rotate, there is no movement of the disc of member 3, as it has the resistance of the driving sprocket and connected parts. Therefore, the planet gears rotate around their own shafts, which in turn rotates the internal gear of the member 2. By moving the control lever 9 in a direction opposite to that of engagement for power delivery, the brake band or shoe of the member 3 is brought into action and serves as a brake to retard the motion set up by the power unit. However, the method of braking with the member 3 is dispensed with for such an application of bulldozer use, and the stopping of the rotation of the disc of member 3 is controlled with the holding brake 21. The disc of member 3 would then serve only as a means of rotating the sprocket 4.

When the control lever 9 is moved to engaging position in either direction, the adjustable connection 34, if movement is away from the driver, and the adjustable connection 35, if movement is toward the driver, overcomes the tension of spring 36 and moves lever 33 toward brake wheel 21, which movement transmitted through the link 32, lever 31, and arms 30, releases band tension on brake wheel 21, permitting free movement of shafts 24 and 24A with their attached parts in any direction, the extent of which is determined by the racks 22, 22. When the lever 9 is returned to neutral position, the spring 36 reverses the motions of arms 30, lever 31, link 32, and lever 33, causing brake band 27 to again stop and hold brake wheel 21. The connections 34 and 35 have slotted openings 34a and 35a, respectively, for attachment to lever 33, taking care of the movement of lever 33 in the opposite direction to which either connection 34 or 35 is to operate. The rack 22 is suitably fastened to a pushing member. When the movements of racks 22, 22 stop, they are held in such position by the pinions 23 and 23A, thus permitting the retention of any blade position. The last tooth 22B on each of racks 22, 22 is enlarged so as not to mesh with the teeth of the rack pinions 23 and 23A, thus serving as a stop to the travel of said racks and insuring the fact that they will not become disengaged from their respective pinions and guide wheels.

To tilt either end of the bulldozer blade for ditching or crowning operation, it is necessary to remove the pin 44 from couplings 29 and 29A, separate the two halves with a pinch bar and insert an end of the pinch bar in one of the holes 45. Then the blade power unit is operated, thus rotating the member 29 to another engaging position with the member 29A, depending on the amount of end tilt desired on the bulldozer blade.

When it is desired to float the bulldozer blade for leveling purposes, lever 9 is moved to a position opposite from that of lift engaging and thus the brake wheel 21 is released from the brake band 27 and is free to move in either direction, corresponding with the movements of the bulldozer blade.

Having fully described our invention, we claim:

1. In a bulldozer, a blade operating mechanism comprising blade holding members pivotally secured to said bulldozer, cables connected to said holding members, means for actuating said cables so as to adjust said holding members about their pivoted connection, racks connected to said holding members, said racks being coactable with said holding members, pinions engaging said racks, a shaft fixed to said pinions, and braking means on said shaft.

2. In a bulldozer, a blade operating mechanism comprising blade holding members pivotally secured to said bulldozer, cables connected to said holding members, means for actuating said cables so as to adjust said holding members about their pivoted connection, racks connected to said holding members and coactable therewith, pinions engaging said racks, a shaft fixed to each of said pinions, braking means for one of said shafts, and means for coupling said shafts.

3. In a bulldozer, a blade operating mechanism comprising a pair of blade holding members pivotally secured to said bulldozer, a cable connected to each of said holding members, means for actuating said cables so as to adjust said holding members about their pivoted connections, a rack connected to each of said holding members, each rack being coactable with its corresponding holding member, a pinion engaging each of said racks, a shaft fixed to each of said pinions, means for braking one of said shafts, and means for coupling said shafts.

4. In a bulldozer, a blade operating mechanism comprising a pair of blade holding members pivotally secured to said bulldozer, a cable connected to each of said holding members, means for actuating said cables so as to adjust said holding members about their pivoted connections, yieldable means associated with each of said cables, means for limiting the action of said yieldable means, a rack connected to each of said holding members, each rack being coactable with its corresponding holding member, a pinion engaging each of said racks, a shaft fixed to each of said pinions, means for braking one of said shafts, and means for coupling said shafts.

5. In a bulldozer, the combination with a tractor of a blade operating mechanism comprising blade holding members disposed at opposite sides of the tractor, the rear ends of said holding members being pivoted to the tractor, bell cranks pivotally mounted on the tractor and having operative connection with the holding members for raising and lowering said members, a cable sheave secured to each of said bell cranks, cable winding drums, a source of power, transmission means for selectively delivering power from said source to said cable drums, a cable associated with each of said sheaves having one end anchored to the tractor and the other end associated with one of said drums, a rack hinged to each of said bell cranks, a pinion gear engaging each of said racks, a shaft fixed to each of said pinion gears, means for coupling said shafts, and braking means for one of said shafts.

6. In a bulldozer, the combination with a tractor of a blade operating mechanism comprising blade holding members disposed at opposite sides of the tractor, the rear ends of said holding members being pivoted to the tractor, bell cranks pivotally mounted on the tractor and having operative connection with the holding members for raising and lowering said members, a cable sheave secured to each of said bell cranks, cable winding drums, a source of power, transmission means for selectively delivering power from said source to said cable drums, a cable associated with each of said sheaves having one end anchored to the tractor and the other end associated with one of said drums, a rack hinged to each of said bell cranks, a pinion gear engaging each of said racks, a shaft fixed to each of said pinion gears, means for coupling said shafts, braking means for one of said shafts, and means for automatically releasing said braking means when power is transmitted from said source to said drums.

THEODORE P. FLYNN.
RAYMOND E. NEILS.